United States Patent [19]
Gudmestad

[11] 3,881,374
[45] May 6, 1975

[54] ROTARY WIRE STRIPPER

[75] Inventor: Ragnar Gudmestad, West Allis, Wis.

[73] Assignee: Artos Engineering Company, New Berlin, Wis.

[22] Filed: May 24, 1974

[21] Appl. No.: 473,274

[52] U.S. Cl. .................................................. 81/9.51
[51] Int. Cl. ........................................... H02g 1/12
[58] Field of Search ............... 81/9.51; 29/33.5, 628

[56] References Cited
UNITED STATES PATENTS

| | | | |
|---|---|---|---|
| 2,645,959 | 7/1953 | Fuchs et al. | 81/9.51 X |
| 2,671,363 | 3/1954 | Wells | 81/9.51 |
| 3,530,746 | 9/1970 | Gudmestad | 81/9.51 |
| 3,552,449 | 1/1971 | Woodward | 81/9.51 |
| 3,630,105 | 12/1971 | Rider | 81/9.51 |

FOREIGN PATENTS OR APPLICATIONS
609,834   10/1948   United Kingdom................. 81/9.51

*Primary Examiner*—Al Lawrence Smith
*Assistant Examiner*—Roscoe V. Parker
*Attorney, Agent, or Firm*—James E. Nilles

[57] ABSTRACT

A rotary wire stripping machine for stripping a predetermined length of insulation from the end of a wire and, in the case of stranded wire, twisting the strands to form a finished end. The machine provides for accurate adjustment of the depth of cut of the insulation and of the twisting mechanism to accommodate a variety of wire and insulation diameters. The machine operates at very high speed in repeated cycles with provision being made for holding the wire stationary during the time that the insulation is being cut and removed from the wire and during the time that the wire strands are being twisted during each cycle of operation.

18 Claims, 20 Drawing Figures

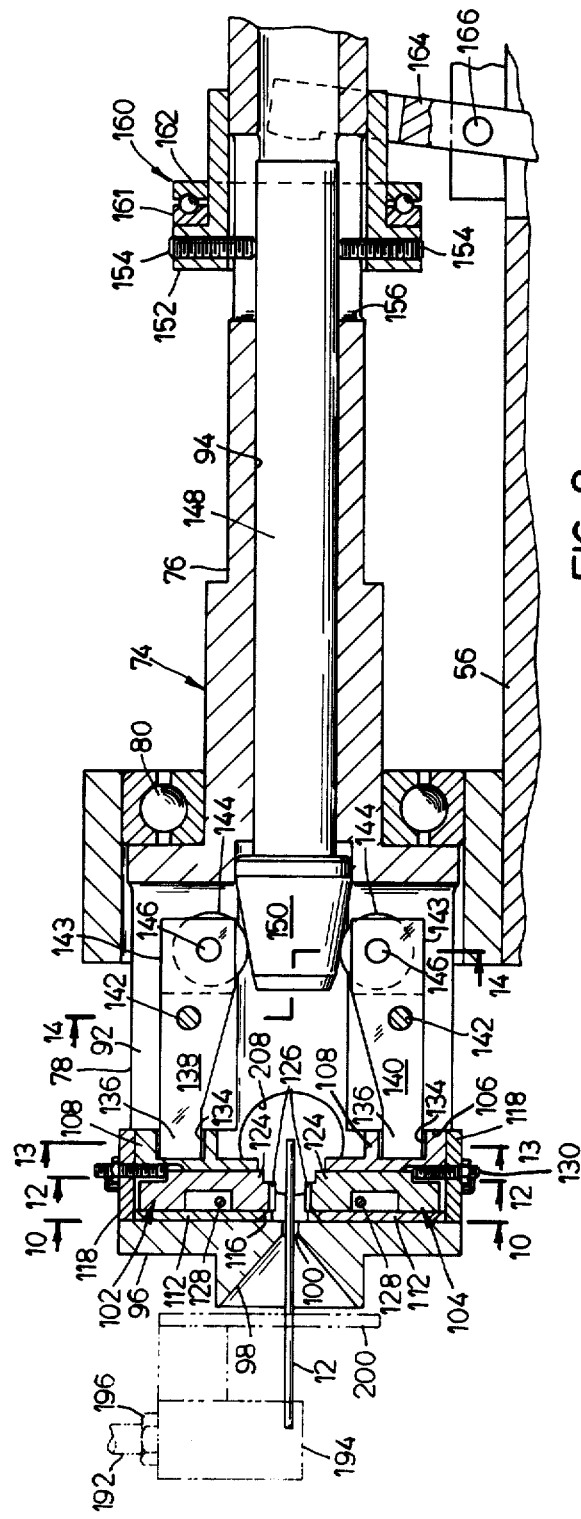
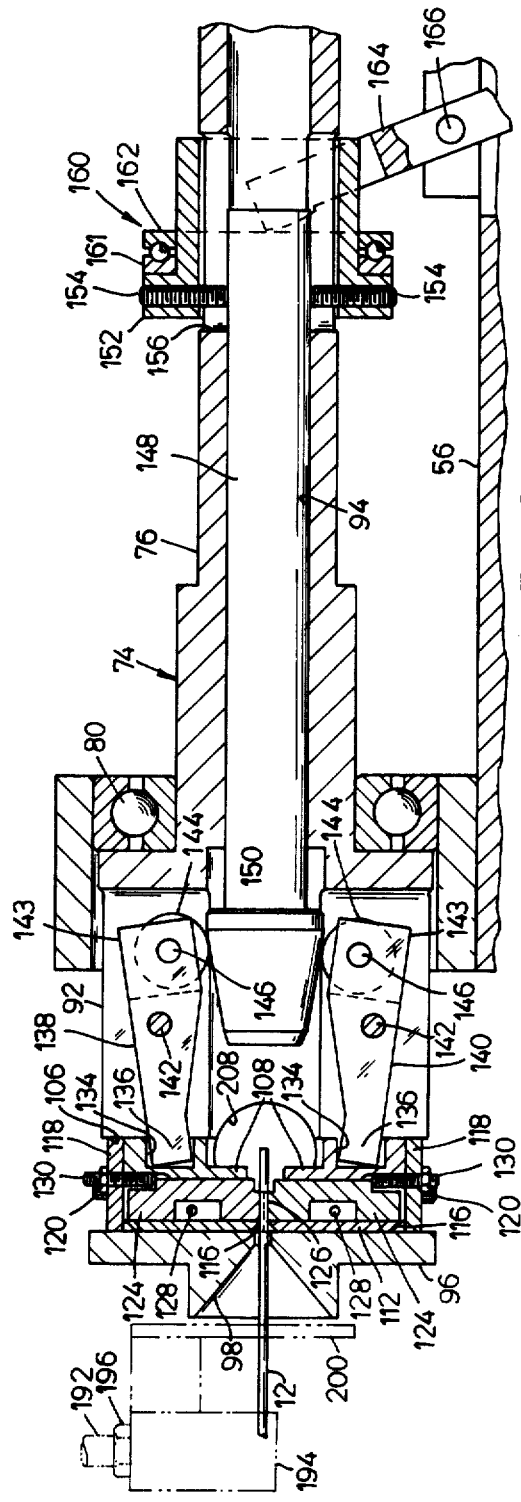

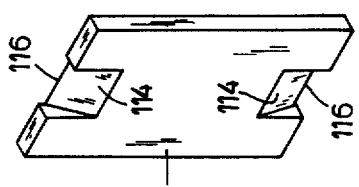
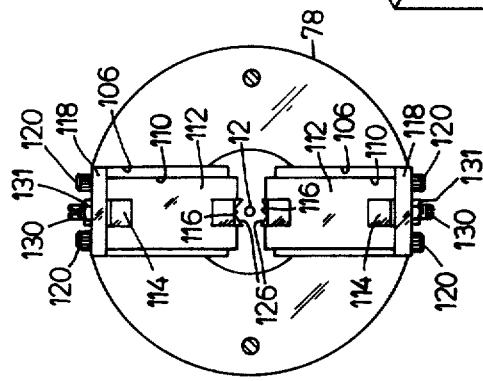
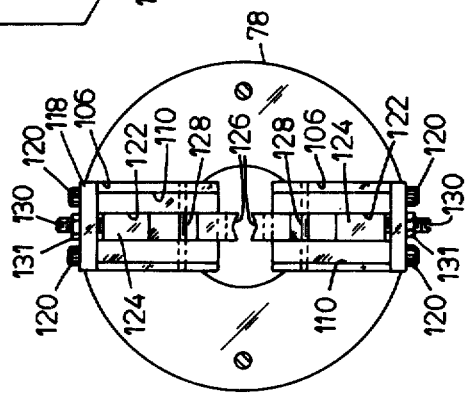
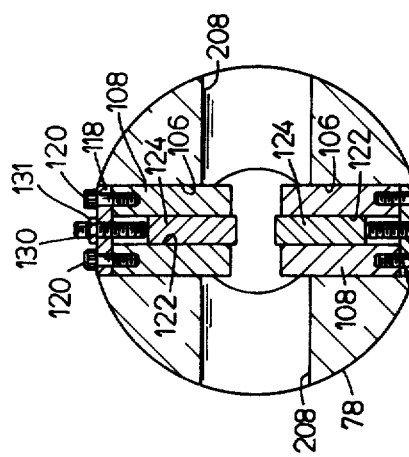
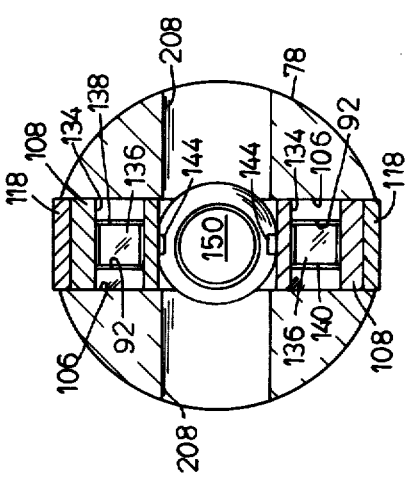
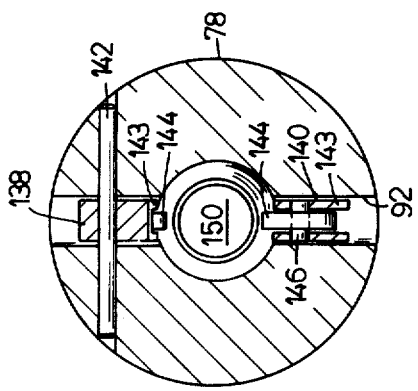
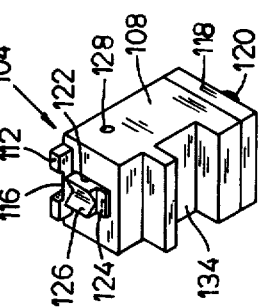
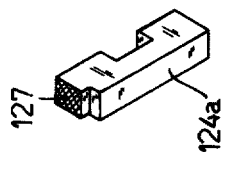

ROTARY WIRE STRIPPER

BACKGROUND OF THE INVENTION

This invention relates to wire strippers for removing insulation from wires and, more particularly, to strippers of the rotary type.

In the preparation of ends of wires repeatedly and at high rates of speed to meet the production demands of highly automated wire preparation machines, wires are advanced to working stations to have insulation stripped from the ends of the wire, or in the case of coaxial cables to have part of the metal braid removed in addition to the insulation. Subsequent operations, such as terminal attaching in the same machine, demands reliability and formation of the stripped wire ends without failures at rates of speed in excess of one wire per second.

Prior art wire strippers such as disclosed in my U.S. Pat. No. 3,530,746 have been completely adequate for the removal of some insulating materials such as P.V.C. However, on certain types of insulations which may include braided cotton or fiberglass braid, these types of strippers have proved inadequate since they fail to form a neat, accurate separation of the severed insulation material from the remaining insulation. In the case of coaxial cables, the removal of insulation as well as the braided metal shield requires a complete and accurate cut, not only through the insulation but through the metal shield. However, prior art rotary strippers have been incapable of operating at the high rate of speed and with the accuracy and consistency required when operating with automatic wire processing machines such as that described in U.S. Pat. No. 3,029,494. In addition, with some types of wire, particularly of the stranded type, the stripping of insulation from the strands of wire has tended to remove the twist in the wire conductor portion so that the ends become frayed making it difficult, if not impossible, to subsequently apply a terminal or a fitting.

At very high speeds of operation, a single cycle of operation requires very precisely timed control of the various operating conditions which must be achieved such as (1) clamping of the wire to be worked in a stationary position and the subsequent releasing of the wire, (2) cutting of the insulation to an accurately controlled depth to insure complete severing of the insulation without damage to the wire conductor portion or complete cutting of the metal shield and insulation on coaxial cable, (3) applying a twist motion to the wire strands of stranded wire, and (4) removing the insulation or the cut insulation and shield from the end of the wire or coaxial cable. All of such functions and operations must be achieved in perfectly timed relationship to each other and at a very high rate of speed during a single cycle.

SUMMARY OF THE INVENTION

The present invention contemplates a mechanism for stripping a predetermined length of insulation of a variety of types from the end of successive wire or shielded cable members as they are advanced to the wire stripper and in the case of stranded wire to also twist the ends of the exposed wire strands to form a finished end for receiving a fitting or terminal. The wire members are worked on in repeated cycles at very high rates of speed. Provision is made to work on a variety of wire types and insulation types, both of varying diameters, by mechanism which is adjustable to very accurately control the depth of cut of insulation which may include braided cotton or fiberglass or, in the case of coaxial cable, a metal shield. Also, when stranded wire is processed, the force which is applied to the wire in the twisting operation may be accurately selected. In addition, although the stripping operation occurs at repeated high frequency, each cycle of operation is precisely controlled to bring about a timed relation between the clamping of the wire at a work station, the precision cutting of the insulation or material to be removed from the wire, the twisting of the wire strands, and the removal of the insulation from the end of the wire member.

BRIEF DESCRIPTION OF THE DRAWINGS

FIG. 8 is a longitudinal cross sectional view of a portion of the rotary stripper mechanism seen in FIGS. 2 and 3, but at an enlarged scale and with parts broken away;

FIG. 9 is a view similar to FIG. 8, but showing another condition of operation of the rotary stripper mechanism;

FIG. 10 is a cross sectional view of a portion of the rotary stripper mechanism taken on line 10—10 in FIG. 8;

FIG. 11 is a view similar to FIG. 10, but with the cutting blades of the rotary stripper mechanism removed;

FIG. 12 is a view similar to FIG. 10 and taken on lines 12—12 in FIG. 8;

FIG. 13 is a view similar to FIG. 12 taken on lines 13—13 in FIG. 8;

FIG. 14 is a cross sectional view of the rotary stripper mechanism shown in FIG. 8 and taken on lines 14—14;

FIG. 15 is a perspective view of a portion of the cutting and stripping mechanism shown in FIGS. 8 and 9;

FIG. 19 is a perspective view of one of the cutting blades of the rotary stripper; and FIG. 20 is a perspective view of an alternate form of a tool element which may be used in the rotary stripper.

DETAILED DESCRIPTION

Figure 1:
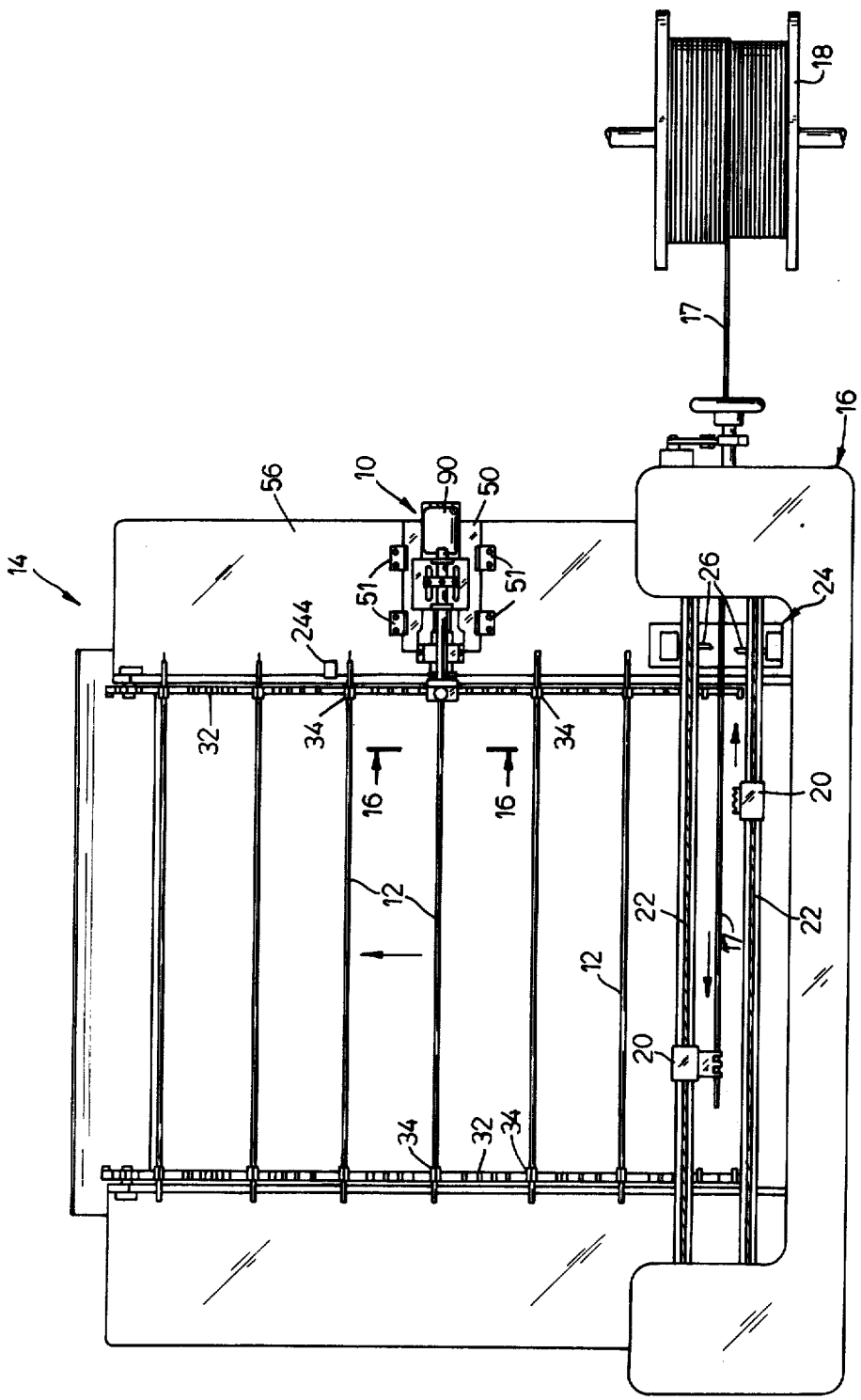
FIG. 1 is a plan view of a wire cutting and conveying machine incorporating a rotary stripper embodying the present invention.

Referring to FIG. 1, the invention is embodied in a rotary wire stripping machine 10 that is adapted to cut insulation which may or may not include braided material or a metal shield from the end of a length of a cable or wire member 12 and to remove the cut material and insulation from the end of the wire and to twist the strands of stranded wire into a finished wire end.

Wire members 12 are advanced in succession along a path by a wire conveying machine 14 which in turn receives the wire members 12 from a wire feeding and cutoff machine 16. The machine 16 operates to withdraw the end of an insulated wire 17 from a supply on a reel 18. The conveyor 14 and wire feeding and cutoff machine 16 are generally of the type shown and described in detail in U.S. Pat. No. 3,029,494.

In general, the wire feeder and cutoff machine 16 includes a pair of oppositely reciprocating wire feeding clamps 20 secured in fixed position to cables 22 and are driven in a manner to move the clamps 20 transversely to the direction of movement of the conveyor 14 and at one end of the latter. The clamps 20 move past a wire cutting mechanism 24 located at one end of the feed and cutoff machine 16 and at one side of the conveyor machine 14.

The clamps 20 are adapted to be opened and closed in timed relation with the various other mechanisms. In operation the clamps 20 travel in opposite directions past each other and past the wire cutoff mechanism 24. One of the clamps 20 is closed to grip the free end of the wire stock 17 and pull the wire from the supply reel 18 while the other clamp 20 remains open during its return an equal distance in the opposite direction to a starting position beyond the cutoff mechanism 24. When the end of the wire 17 is moved to the end of its feed stroke, the other clamp 20, which is adjacent the cutoff mechanism, grips the end of the incoming wire stock 17. At the end of each such feeding stroke, and while both of the clamps 20 remain closed, the knives 26 are actuated to sever a length of wire 12 from the wire stock 17. Thereafter, the clamp 20 which has completed its feeding stroke is opened and returned as the other clamp 20 remains closed to feed the free end of the wire supply 17 past the knives 26.

The conveyor 14 for receiving the cut lengths of wire or wire members 12 includes a pair of endless conveyor chains 32 which are simultaneously driven in a suitable manner in timed relation with the wire feeding and cutoff mechanism 26 to intermittently advance the wire members 12 from one work station to another. Each of the chains 32 is supported on a rail or frame 33 so that the upper run of each of the conveyor chains 32 is maintained in a generally horizontal position during its movement. Each of the chains 32 carries a series of wire grippers 34 spaced apart equal distances to maintain the wire members 12 in parallel relationship as they travel from one work station to another and from one end of the conveyor machine 14 to the other.

Figure 17:
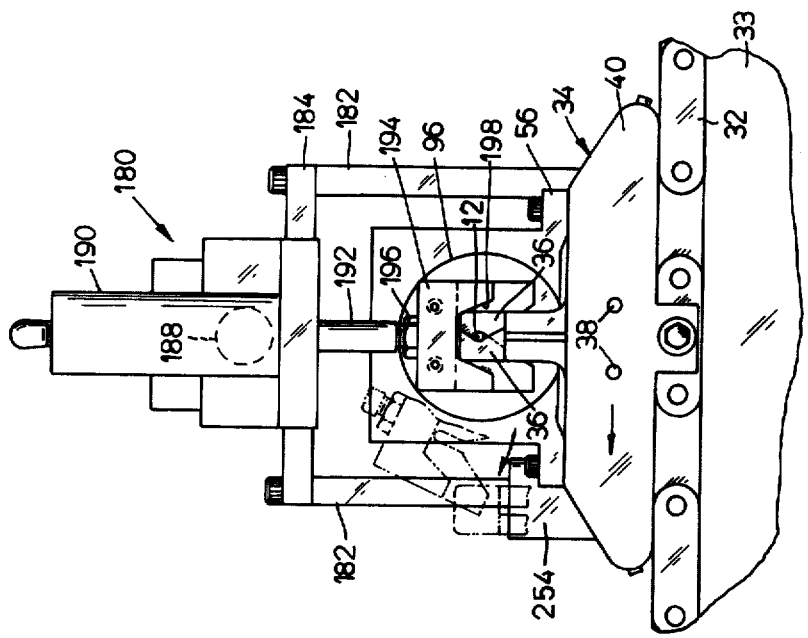
FIG. 17 is a view similar to FIG. 16 but showing another condition of operation.
Figure 16:
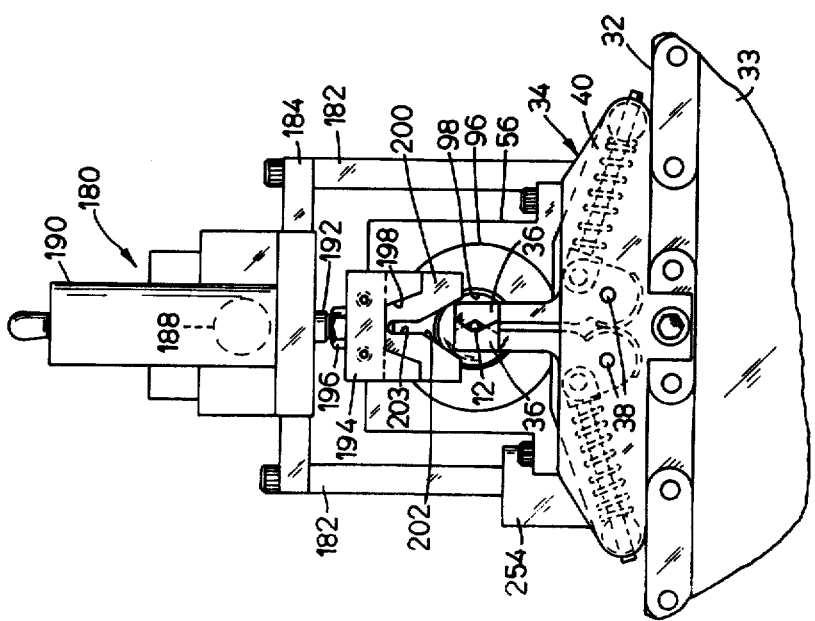
FIG. 16 is a view at an enlarged scale of the wire cutting and conveying mechanism together with the rotary stripper mechanism taken on line 16—16 in FIG. 1.

As seen in FIGS. 16 and 17, each of the wire grippers 34 comprises a pair of jaws 36 mounted on pivot pins 38 which are carried by a support 40 secured to selected links of the conveyor chains 32. The jaws are interconnected so that they swing simultaneously in opposite directions from an open position to the wire gripping position in which they are shown in the drawings. The jaws of the wire grippers 34 of the two conveyor chains 32 are simultaneously operated in timed relationship with the wire feed and cutoff mechanism 16 as described in detail in U.S. Pat. No. 3,029,494.

As the pair of grippers 34 supported on the chains 32 approach the work station or zone in which the wire members 12 are being formed from the wire stock 17, the jaws 36 of the grippers are in an open position. As each wire severing operation is being conducted, the jaws 36 of the grippers 34 at opposite sides of the conveyor 14 and adjacent to the wire 17 are moved to closed position to simultaneously grip the wire 17. After the wire 17 is severed into a wire member 12 of predetermined length the grippers 34 at each end of the wire member 12 move to convey the wire member 12 to the next work station and at the same time a new wire severing cycle is begun.

Figure 2:
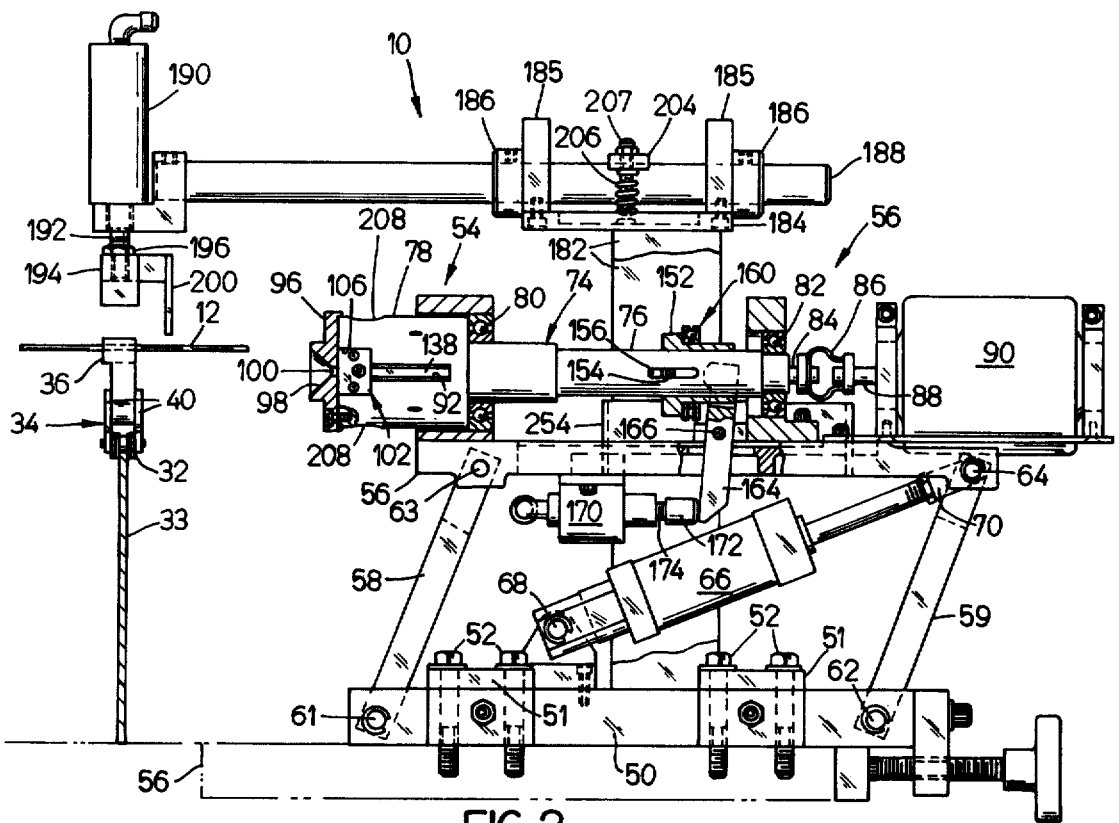
FIG. 2 is a side elevation of the rotary stripper shown in FIG. 1 but at an enlarged scale and partly in section with the rotary stripper shown in an inoperative position.
Figure 3:
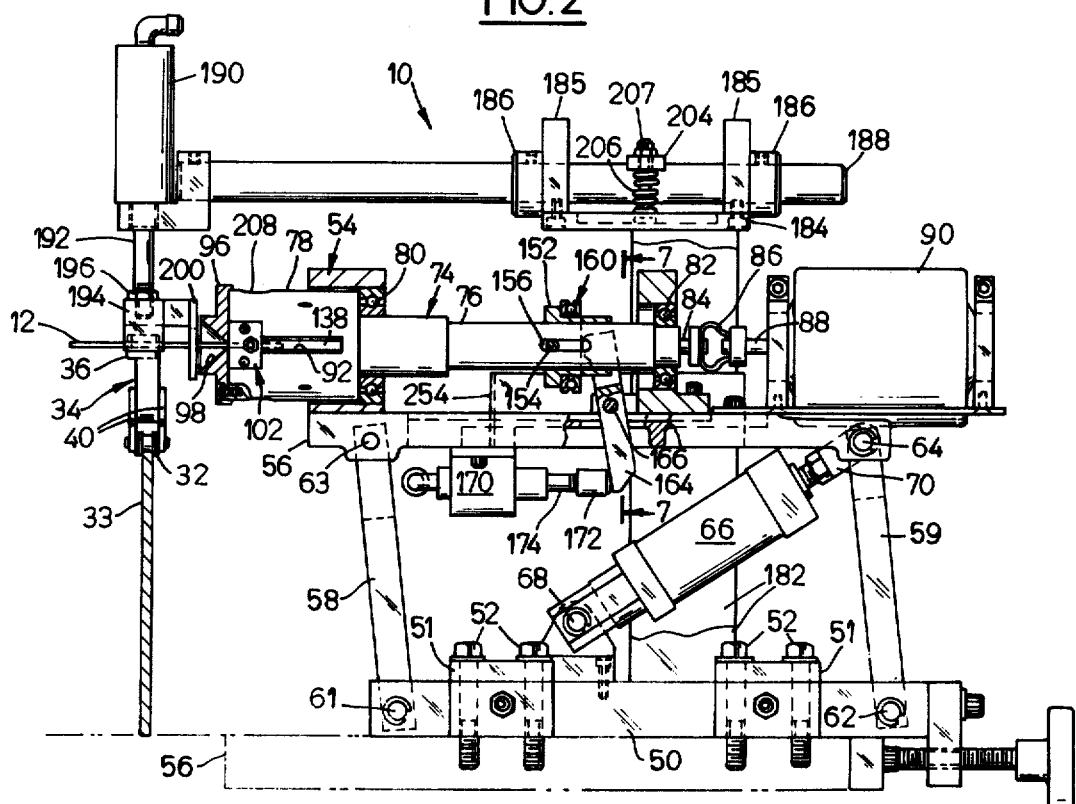
FIG. 3 is a view similar to FIG. 2 but showing the wire stripper in its operative position in which it is working on the end of a wire.

In general, the wire stripping machine 10 seen in FIGS. 2 and 3 includes a base 50 which may be mounted in a selected position at one of the wire working stations on the wire conveying machine 14 which advances the wire members 12 from station to station. The base may be secured to the conveyor machine 14 by means of clamps 51 and bolts 52. A rotary, cutting, stripping and twisting assembly 54 is supported on a carriage or table 56 for movement relative to the base 50 from the position shown in FIG. 2 to the position shown in FIG. 3. In the latter position the stripping machine 10 is positioned to perform its stripping and twisting operation on the end of the wire member 12.

Figures 5, 6, 7:
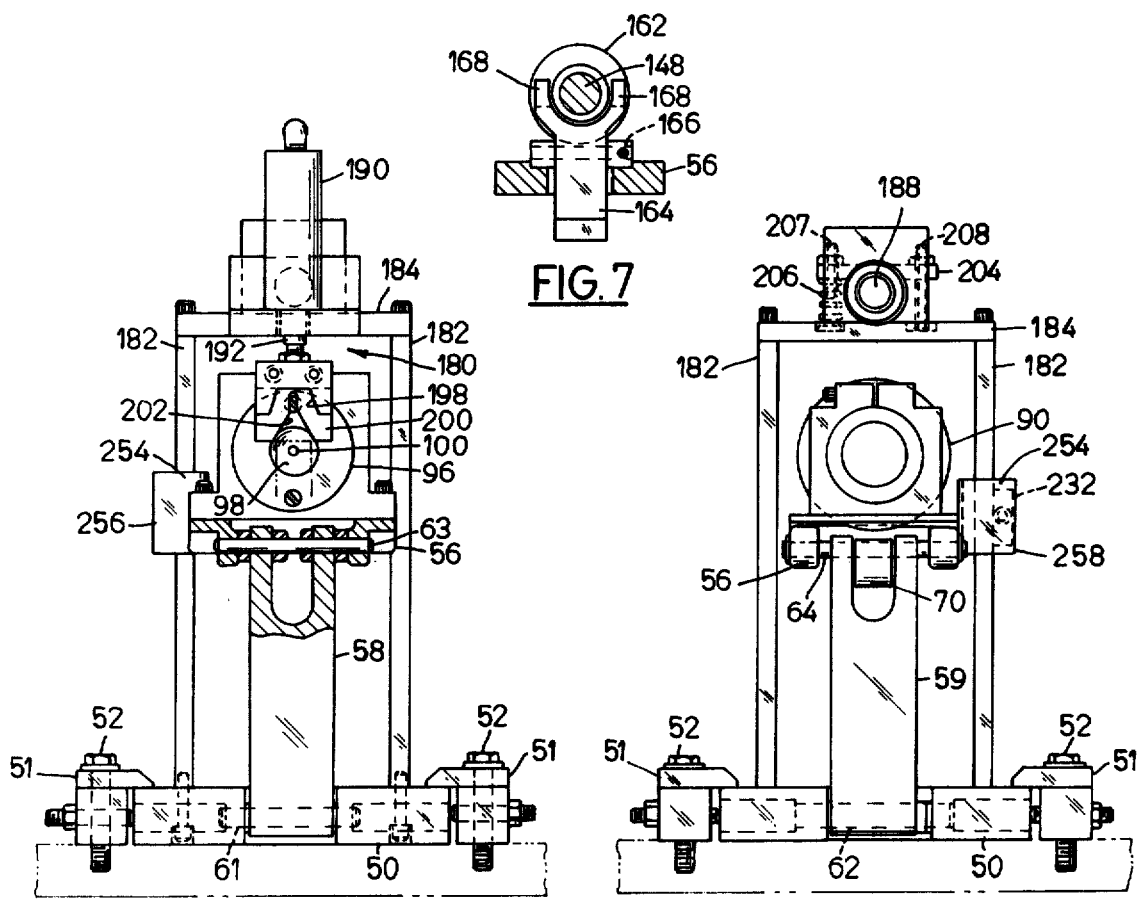
FIG. 5 is an end view taken from the left end of the rotary stripper as seen in FIG. 3.
FIG. 6 is an end view taken from the right end of the rotary stripper seen in FIG. 3.
FIG. 7 is a sectional view taken on line 7—7 in FIG. 3.

The carriage 56 is supported in an elevated position above the base 50 by a pair of arms 58 and 59. The lower ends of the arms 58 and 59 are pivoted on pins 61 and 62 relative to the base 50, respectively, and the upper ends of the arms are pivoted by pins 63 and 64, respectively, to the carriage 56. The arms 58 and 59 serve to support the carriage 56 during generally horizontal movement relative to the stationary base 50 between the position shown in FIGS. 2 and 3. The carriage 56 is moved between its two positions by means of a double-acting air actuator 66 which has its cylinder end portion pivoted by means of a pin 68 to the base 50. The rod end of the cylinder 66 is provided with a connecting element 70 which, as seen in FIG. 6, is connected to the pin 64 supporting the upper end of the arm 59 to the carriage 56. In the extended position of the air cylinder 66, shown in FIG. 2, the table is maintained in spaced relation to the end of the wire member 12 and, upon retraction of the cylinder 66, the table 56 is moved to the wire working position shown in FIG. 3.

The rotating stripper assembly 54 which is supported on the table 56 includes an elongated rotatable housing member 74 having a stem portion 76 and a head portion 78. The member 74 is supported for rotation about a generally horizontal axis in a head bearing 80 and in a stem bearing 82, both of which are mounted in supports fixed to the carriage 56. The end of the rotatable housing member 74 is provided with a shaft 84 rigidly connected to the stem portion 76 and is joined by a flexible coupling 86 to the drive shaft 88 of an electric motor 90 which serves to continuously rotate the member 74 during the stripping operation.

As seen in FIGS. 8 and 9, the head portion 78 of the rotatable member 74 forms a cavity 92 which opens to a bore portion 94 formed within the stem 76. The opposite end of the cavity 92 is closed by a cap member 96 which has a conical recess 98 which acts to engage and guide the end of a wire member 12 into and through an opening 100 to a working position within the cavity 92.

Wire Working Assemblies

When the end of the wire member 12 is disposed within the cavity 92 it is worked on by a pair of blade members or wire working assemblies 102 and 104 which act on the end of the wire member 12 to cut the insulation to a predetermined depth, to remove the insulation from the end of the wire member 12 and to expose the wire strands which are twisted to form a finished end.

The head portion 78 has a pair of diametrically opposed notched portions 106, one of which can be seen in FIG. 2, and which slideably receive the wire working assemblies 102 and 104. The assemblies 102 and 104 are held axially of the head 78 and within the notched portions 106 by means of the cap member 96.

Referring now to FIGS. 10 through 12 and 15, each of the wire working assemblies 102 and 104 includes a blade supporting block 108 which has a milled notch 110 adapted to receive a cutting blade 112 which is shown separately in FIG. 19. Each of the cutting blades 112 is generally flat and rectangular in shape and is provided with slotted portions 114 which form chisel-like cutting edges 116 at opposite ends of the blade 112. Only one of the cutting edges 116 at one end of the blade element 112 is positioned to perform a cutting operation at any given time, but as one of the cutting edges 116 becomes worn the blade element 112 may be reversed to put the other cutting edge 116 into operation. The radially outer end of the blade receiving notch 110 is closed by a cap member 118 which is rigidly secured to the blade supporting block 108 by cap screws 120. The cap member 118 serves to close the end of the slot 110 and limit radial outward movement of the blade supporting elements 112.

Referring now to FIG. 11, the milled notch 110 in each of the blade supporting blocks 108 has a rear face which opens to a deeper milled notch 122. Each of the milled notches 122 slideably receive a tool element 124. As seen in FIG. 11, the radially inner end of each tool element 124 is formed with a notch 126. The notches 126 are so formed that when the wire working assemblies 102 and 104 are disposed in diametrically opposed relation to each other, as seen in FIG. 11, the opposed notches 126 can be moved toward each other to engage diametrically opposed portions of the insulation on the end of the wire members 12 which is particularly useful in cutting insulation and metal shielding on coaxial cable. In the case of stranded insulated wire it is advantageous to employ tool elements 124a, one of which is seen in FIG. 20. Tool elements 124a are similar to tool elements 124 except that the notches 126 have been replaced by flat, knurled surfaces 127. The surfaces 127 serve to grip the surface of insulation on stranded wire to apply a twisting action to the insulation and wire within.

The tool element 124, as seen in FIG. 8, is generally C-shaped in cross-section, and a pin 128 passes through the walls of the block 108 at opposite sides of the notch 122 seen in FIG. 11 to retain the tool element 124 connected to the blade supporting block 108. As seen in FIG. 12, the radially outer position of the tool element 124 is determined by an adjusting screw 130 threadably engaged in the cap members 118. The screw 130 may be moved to a selected position of adjustment relative to the cap member 118 and may be locked in position by a lock nut 131.

As seen in FIGS. 13 and 15, the face of the blade supporting bock 108 opposite to the cutting blade 112 is provided with a milled groove 134 which extends trasversely to the groove or slot 110 containing the blade 112.

The grooves 134 in each of the wire working assemblies 102 and 104, as best seen in FIGS. 8 and 9, form sockets to receive the ends 136 of a pair of arms 138 and 140. The arms have intermediate portions pivoted on pins 142 having their opposite ends supported in openings in the head portion 78, as seen in FIG. 14. The ends of the arms 138 and 140 opposite to the end portions 136 are bifurcated at 143 and each of the bifurcations receives a roller 144 which is rotatable on an axle 146.

The arms 138 and 140 are pivotable about their mounting pins 142 to move the working assembly 102 and 104 from a wire receiving position, as shown in FIG. 8, to a wire working position, as shown in FIG. 9. Movement of the arms 138 and 140, and therefore the working assemblies 102 and 104 is accomplished by a plunger 148 slideably mounted in the bore 94 of the stem portion 76. The left-hand end of the plunger 148 is formed with a generally frustoconical head 150 which acts as a cam member to engage the rollers 144 associated with the arms 138 and 140. Upon leftward movement of the plunger 148 in the bore 94, from the position shown in FIG. 8 to the position shown in FIG. 9, the arms 138 and 140 are simultaneously pivoted so that the arm ends 136 move toward each other and move the working assemblies 102 and 104 radially inward from the wire receiving position to the wire working position shown in FIG. 9.

The plunger 148 is connected to a collar 152 slideably mounted on the outer surface of the stem portion 76 by means of diametrically opposed screws 154. The screws 154 pass freely through longitudinally extending slots 156 in the stem portion 76 so that the plunger 148 and the collar 152 move as a unit axially of the stem portion 76. Collar 152 supports a ball bearing assembly 160 having a race 161 which is adapted to rotate with the collar 152 and a race 162 which is free to rotate relative to the collar 152 and to engage the upper end of a yoke 164. As seen in FIG. 7, the yoke 164 is pivoted on a pin 166 relative to the carriage 56. The upper end of the yoke is forked and has tine portions 168 which are adapted to engage the outer face of the bearing race 162 at opposite sides of the plunger 148 so that, when the yoke 164 is pivoted in a clockwise direction from the position shown in FIG. 8 to the position shown in FIG. 9, the portions 168 engage the race 162 and move the collar 152 together with the plunger 148 to the left. Such movement is accomplished by a single acting, spring returned, air actuator 170 which, as seen in FIG. 3, engages the yoke 164 below the pivot pin 166. When the air actuator 170 is extended from the position shown in FIG. 2 to the position shown in FIG. 3, the yoke 164 is moved in a counterclockwise direction to bring about the required plunger movement. Leftward movement of the plunger moves the cam 150 between the rollers 144 and swings the arms 138 and 140 so that the outer ends 136 of the arms move toward each other and at the same time move the wire working assemblies 102 and 104 towards each other into working position relative to the wire member 12. During such movement of the plunger 148, the housing member 74 and the mechanism contained therein is being continuously rotated by the motor 90.

The amount of movement of the plunger 148 toward the left determines the amount of movement of the wire working assemblies 102 and 104 toward each other. Such movement can be controlled and adjusted by means of an element 172 which, as seen in FIGS. 2 and 3, is threaded on the end of the rod 174 of the air actuator 170. By threading the element 172 relative to the rod 174 the end of the stroke of the air actuator 170 may be adjusted and as a consequence the extreme left position of the plunger 174, as seen in FIG. 9, can be selected to determine the spacing of the wire working assemblies 102 and 104 when they are in their working position. Alternatively, the depth of cut can be determined by using cutting blades 112 which are accurately ground to locate the cutting edges 116 spaced from the ends of the blade members 112. The wire working assemblies 102 and 104 can be moved toward each other so the ends of blade members 112 abut each other as seen in FIG. 9. The spaced cutting edges 116 will determine the depth of cut and by substituting various pairs of blade members 112, different wire sizes can be accommodated.

Clamp Lock Assembly

A clamp lock assembly generally designated 180 is supported in elevated position above the table 56 by a pair of vertical frame members 182 which can be seen in FIGS. 16 and 17. The vertical members 182 support a platform 184 in a generally horizontal position, and the platform supports a pair of blocks 185 each of which supports a collar 186. The collars 186 journal a shaft 188 in an elevated position to project to the left of the base 50 as seen in FIGS. 2 and 3. The left end of the shaft 188 supports a single-acting, spring returned, air actuator 190 having an actuating rod 192 which can be reciprocated vertically above a conveyor chain 32 as seen in FIG. 2. The end of the actuator rod 192 threadably receives a clamp lock element 194 which is locked in position by means of a lock nut 196. As best seen in FIG. 16, the clamp lock 194 has a recess at its underside with facing inclined walls 198. Upon extension of the air actuator 190 from the position shown in FIG. 16 to the position shown in FIG. 17, the walls 198 engage the pair of wire gripping jaws 36 and wedge them together to insure that the wire member 12 is locked in a stationary, nonrotatable position. Also supported from the rod 192 of the air actuator 190 is a wire guide 200 which moves with the clamp lock 194. The wire guide 200 has a generally V-shaped slot 202 which merges with an elongated slot 203. Upon extension of the air cylinder 190 from the position shown in FIG. 16, the openings 202 and 203 serve to engage the end of the wire member 12 at a point intermediate the wire gripping jaws 36 and the free end of the wire member 12 so that the latter is guided into position for alignment with the conical recess 98 at the end of the rotatable member 74.

Figure 4:
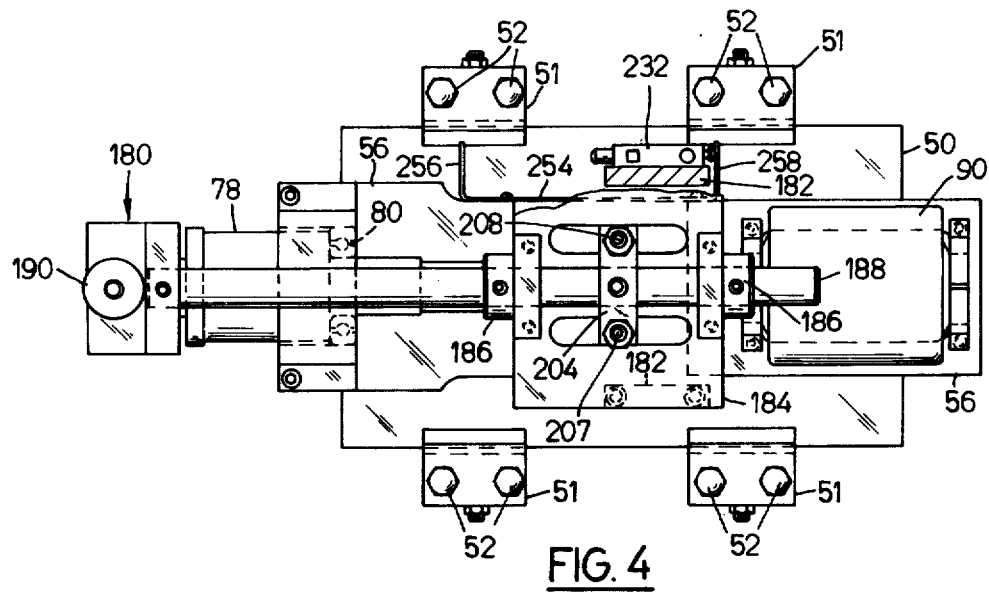
FIG. 4 is a top plan view of the rotary stripper in the wire working position in which it is shown in FIG. 3.

Referring now to FIGS. 4 and 6, a portion of the shaft 188 between the collars 186 rigidly mounts an arm 204 extending transversely of the shaft. A spring 206 has one end fastened by a bolt 207 to one end of the arm 204 and the opposite end of the spring is seated on the platform 184. The other end of the arm is provided with a bolt 208 having its free end normally contacting the platform 184. The spring 206 and bolt 208 serve to yieldably maintain the air actuator 190 in a generally vertical position as shown in the drawings. In the event that the clamp lock 194 is in engagement with the jaws 36, as shown in FIG. 17, and the chain 32 is accidentally advanced to the left, the clamp lock 194 is moved to the position shown in broken lines to swing the air actuator 190 together with the shaft 188 in a generally clockwise direction so that the air actuator 190 and its associated clamp lock 194 and wire guide 200 are not damaged. If the conveyor is moving in the opposite direction relative to the machine 10, the shaft 188 must be free to rotate in the opposite direction which is accomplished by reversing the positions of the long bolt 208 and the spring 206 on the arm 204 in FIG. 6.

Operation

The wire stripping machine 10 is intended to operate in rapid, repeated cycles so that the ends of the wire members 12 can be prepared at a high rate, for example, one in less than a second. A single cycle of operation can be considered as being initiated when the various components of the stripping machine 10 occupy the position shown in FIG. 2. Under such conditions a wire member 12 will have been advanced to the station occupied by the wire conveyor machine 14 so that the wire member 12 is held in a supported generally horizontal position with its end in spaced relation to the cap member 96 on the rotating head 78. The carriage 56 will be in its extreme right position with the air actuator 66 extended. Also, the air cylinder 170 associated with the yoke 164 and the air actuator 190 associated with the clamp lock 194 will be in the retracted positions. The wire working cycle is initiated by retracting the cylinder 66 so that the table 56 is moved to the left from the position shown in FIG. 2 to the position shown in FIG. 3. Simultaneously, with the initiation of such table movement, the air cylinder 190 is extended to move the rod 192 downwardly so that the clamp lock 194 engages the jaws 36 of the wire gripper 34 to lock the wire member 12 in a secure position while the free end of the latter is being guided by the conical recess or guide 98 so that the end of the wire member 12 is positioned within the head portion 78 as seen in FIG. 8. After this occurs, the air actuator 170 is extended to swing the yoke 164 and to move the plunger 148 to the left to the position shown in FIG. 9. In the latter position the wire working assemblies 102 and 104 are moved radially inward toward the axis of rotation and of the wire member 12. Upon movement of the wire working assemblies 102 and 104 the cutting edges 116 of the blade elements 112 engage and cut through the insulation material which may be considered to include all of the material to be removed from the wire member 12 such as insulation or metal, fabric or fiberglass material. The depth of such cut is determined by the thickness of the insulation material and the diameter of the wire and can be regulated by adjustment of the element 172 relative to the rod 174 of the air actuator 170. Alternately, appropriately formed blade elements 112 can be brought into engagement with each other with the spacing of the cutting edges 116 determining the depth of cut.

If the wire members 112 on which the stripping action is being conducted are of the coaxial cable type which incorporate a metallic shield, it is desirable to use tool elements 124 with notched portions 126. If, for example, it is desired to cut such a cable so that the outer insulation and the metal shield are removed to expose an inner layer of insulation, the blade members 112 can be adjusted to cut to the precise depth required and as the notched portions 126 move toward each other they serve to confine and guide the extreme end of the coaxial wire member 12. The tool elements 124 can be adjusted so that, as the metallic shielding material is being cut, the surfaces of the notches 126 will be in close proximity to or in engagement with the surface of the outer layer of insulation to support the free wire end to insure a complete and accurate cut.

If the wire member 12 is of stranded insulated type, tool elements 124a with knurled surfaces 127 can be used instead of notched tool elements 124. At the same time that the cutting edges 116 are severing the insulation at the end of the stranded wire member 12, the surface portions 127 of the tool elements 124a engage and grip the outer surface of the insulation at diametrically opposed portions. The surfaces 127 serve to align the wire relative to the knife cutting edges and also to apply a slight pressure to the outer surfaces of the severed portion of insulation so that the latter will rotate relative to the stationary wire.

After the insulation or the insulation and shielding have been cut on the end of a wire member 12, the air actuators 170 and 190 will remain in their extended condition, and the air actuator 66 is extended from the position shown in FIG. 3 to the position shown in FIG. 2 so that the carriage 56 is moved to the right. This causes the wire working assemblies 102 and 104, which remain in the position in which they are shown in FIG. 9, to pull the severed material such as insulation and shielding material from the end of the wire member 12. In the case of stranded wire, the severed end of the insulation is gripped between the surfaces 127 of the wire tool elements 124a and the severed insulation portion is rotated relative to the stationary strands of wire so that they are twisted by the rotating portion of insulation to provide a finished, twisted wire end on the wire member 12.

As the table moves sufficiently to remove the insulation from the end of the wire member 12 and to twist the wire strands of stranded wire, the cylinders 170 and 190 are retracted to the position in which they are shown in FIG. 2. The severed insulation portions will be expelled through diametrically opposed openings 208 formed in the head portion 78 by the action of centrifugal force.

Retraction of the cylinder 170 releases the force on the yoke 164 urging the plunger to the right in FIG. 9 so that centrifugal force acting on the stripper assemblies 102 and 104 causes them to move outwardly and to swing the arms 138 and 140 so that the rollers 144 move radially inward. The inwardly moving rollers apply a force to the conical cam member 150 so that the plunger 148 is moved toward the right to its retracted position shown in FIG. 8 with the plunger 142 in engagement with the yoke 164 which in turn is engaged by the element 172 on the actuator 170. This serves to limit the extent of outward movement of the wire working assemblies 102 and 104.

Retraction of the air cylinder 190 releases the clamp lock 194 from the jaws 36 so that the conveyor chains 32 can be advanced to position the wire member 12 with its finished end in its next working station and a new wire member 12 can be positioned in readiness for the next cycle of operation of the wire stripping machine 10.

At this point it should be noted that the depth of cut of the wire insulation can be adjusted by a proper positioning of the element 172 on the rod 174 of the actuator 170. The element 172 determines the extreme end of the stroke of the actuator 170 which in turn determines the end of the stroke of the plunger 148 and, therefore, the spacing of the wire working assemblies 102 and 104 when they are in their wire working position as shown in FIG. 9. The final position of the plunger 148 also can be adjusted by withdrawing the screws 154 in the collar 152 and repositioning the plunger 148 relative to the collar 152.

The amount of pressure applied to the outer surface of the wire insulation by the notches 126 of the tool elements 124 or the surfaces 127 of the tool elements 124a may be adjusted by a proper positioning of the elements 124 or 124a relative to the cutting edges 116 in each of the wire working assemblies 102 and 104. This position is determined by adjusting the screws 130 relative to the supporting block 108, as best seen in FIG. 12. The centrifugal force acting on the opposed tool elements 124 or 124a will cause them to move radially outward against the ends of the adjusting screws 130 which are in a fixed position relative to the support block 108.

The length of insulation or other material to be removed from the end of the wire member 12 can be selected by loosening the bolts 52 associated with the clamps 51 and moving the base member 50 of the machine 10 away from or toward the end of the wire member 12 and thereafter retightening the bolts 52.

Fluid Pressure Circuit

Figure 18:
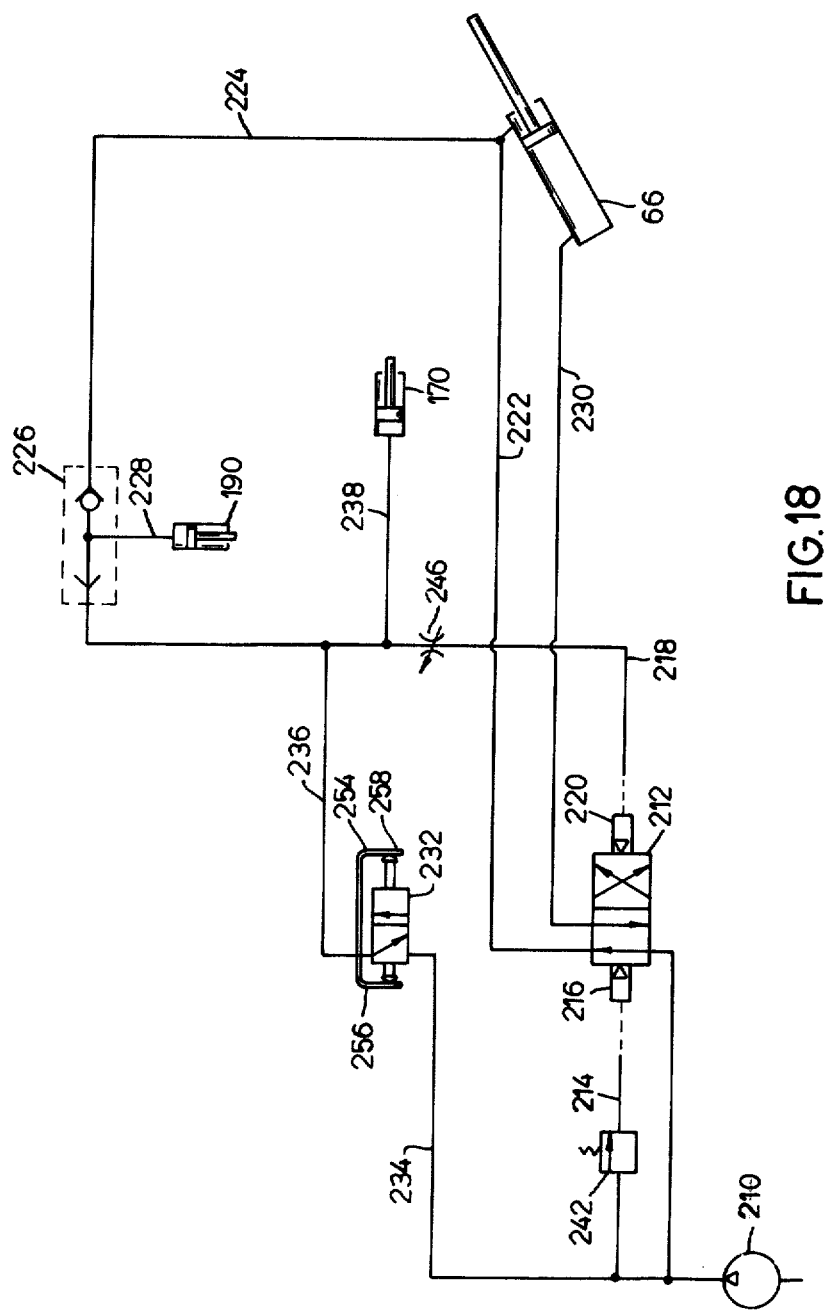
FIG. 18 is a diagrammatic view of the control circuit by which the rotary wire stripper is operated.

Since the entire operating cycle of the stripping machine 10 occurs very rapidly, for example, in one second, the sequence of operation of the air actuators 66, 170 and 190 is extremely critical and is accomplished by an air control circuit best understood from an examination of FIG. 18. An air compressor 210 delivers air at a pressure to the order of 80 psi to the circuit and to a twoposition valve 212. The valve 212 moved to the position shown by a signal of air delivered through a line 214 to an air actuated pilot cylinder 216 or to its second position by air delivered through a line 218 to an air actuated pilot cylinder 220. In the position of the valve 212 shown in FIG. 18, air is delivered from the valve 212 through a line 222 to the rod end of the air actuator 66 associated with the table and simultaneously through a line 224 to a shuttle valve 226 and through a line 228 to the clamping cylinder 190. Simultaneously with delivery of air to the line 222 and to the rod end of the air actuator 66, air is expelled from the opposite end of the cylinder 66 through a line 230 to the valve 212 and to the atmosphere.

Upon delivery of air to the line 218, the pilot cylinder 220 is actuated to shift the valve 212 to its second position so that air is delivered from the compressor 210 through the line 230 to the piston end of the air actuator 66 to cause extension of the latter. At the same time that air is being delivered in the line 230 air is being exhausted from the clamp cylinder 190 to the shuttle valve 226 and through line 222 through the valve 212 to the atmosphere.

The air control circuit also includes a valve 232 which is shown in its closed position and which is connected to receive air from the supply 210 by way of a line 234. In an open position of the valve 232 it is connected by a line 236 to the line 228 which delivers air to the pilot 220 and also to the shuttle valve 226. The cylinder 170 for moving the wire working assemblies 102 and 104 is connected by way of a line 238 with the line 228 so that delivery of air through the open valve 232 is operative to actuate the cylinder 170 to bring the wire working assemblies into position to work on the end of the wire member 12.

The air control circuit also includes a solenoid operated valve 242 which is connected to the source of air pressure 210 and to the line 214 operating the pilot cylinder 216 associated with the valve 212. The valve 242 is moved from a closed to an open position in response to actuation of the solenoid upon receiving an electrical impulse from a control mechanism indicated at 244 in FIG. 1 and associated with the conveyor chain 32 so that, as the chain moves to each of its indexing positions, solenoid valve 242 is actuated to deliver an impulse of air to the pilot cylinder 216.

The circuit also includes an adjustable variable orifice valve 246 which is disposed in the line 218 between the cylinder 170 and the pilot cylinder 220 associated with the valve 212 for a purpose to be described hereafter.

The circuit shown in FIG. 18 is shown at the instant following the delivery of an impulse of air to the pilot 216 with the machine 10 in the condition shown in FIG. 2 and the air actuator 66 extended. Air will be delivered from the compressor 210 and through the valve 212 and the line 222 to retract the cylinder 66 and at the same time to extend the air actuator 190. This will bring about simultaneous movement of the carriage 56 from the position shown in FIG. 2 to the left and will bring the clamping cylinder 190 into operation to clamp the jaws 36 on the wire member 12. Referring now to FIG. 4, when the table 56 reaches its extreme left position, as also seen in FIG. 3, a bracket 254 secured to the side of the carriage 56 and having a pair of legs 256 and 258 is positioned to move relative to the valve 232. Referring now to FIG. 18, the valve 232 is in a position illustrated when the carriage 56 is in its extreme right position and the bracket leg 256 has engaged the left pushbutton on the valve 232. As the table moves to the left in response to retraction of the air actuator 66, the leg 258 engages the pushbutton at the right of the valve 232 to move the latter to its open position so that air is delivered through the lines 234, 236 and 238 to the air actuator 170 associated with the wire working assemblies 102 and 104 to move them to a wire working position. At the same time air is metered through the variable orifice valve 246 which delays the operation of delivery of air to the pilot cylinder 220. Such delay is required to insure that sufficient time is allowed for the cutting edges 116 to cut the insulation on the wire. The valve 246 may be adjusted so that, if air is being delivered at 80 psi to the air actuator 170, the pilot cylinder 220 will not be actuated until the air in the line 218 between the valve 240 and pilot 220 achieves a level of approximately 60 psi. When this occurs the valve 212 is shifted to its other position so that air is exhausted from the rod end of the cylinder 66 and at the same time air is delivered through line 220 to cause initial extension of the air actuator 66 so that the carriage 56 moves to the right toward its initial position as shown in FIG. 2. During such initial movement of the carriage 56 valve 232 will remain open and the shuttle valve 226 will be in its right position as viewed in FIG. 18. This will prevent the exhaust of air from the clamp actuator 190 to the line 224 and also will serve to maintain air in the line 238 to the cylinder 170. As a consequence, the wire member 12 will remain clamped and the wire working assemblies 102 and 104 will remain in their working position so, as the carriage begins its movement, the severed insulation will be rotated and will be pulled axially from the end of the wire member 12. When the leg 256 of the bracket associated with the carriage 56 engages the left button on the valve 232, the valve will be moved to its closed position relative to the compressor 210 and air will be exhausted from the actuator 170 and the actuator 190 through the line 236 to the valve 232 and to the atmosphere.

When the table, or carriage, 56 reaches its extreme right position, as shown in FIG. 2, the cycle will be complete and the conveyor chain 32 can be moved to the next work position to insure that the solenoid valve 242 is operated to initiate a subsequent cycle of wire stripping and twisting.

A rotary wire stripping machine has been provided for stripping insulating and other material from the ends of various types of wire which may incorporate cotton or fibreglass braiding or, in the case of shielded coaxial cable, a metallic shield. In the case of stranded wire, the removal of the insulation material also serves to twist the exposed strands at the end of the wire to form a finished wire for receiving a terminal or other connection. Provision is made also for the accurate adjustment of the depth of cut of the insulation and other material to be removed from the end of the wire so that wires of varying diameters and thickness of insulation can be accommodated to form a neat, clean wire end. In addition, provision is made for the accurate adjustment of tool elements which engage the outer surface of the insulation with a selected pressure to guide and support the extreme end of the wire during the cutting operation and during twisting of strands of stranded wire. The stripping machine operates at very high speeds and in repeated cycles with the various operations being performed during each cycle. Such operations include clamping a wire, cutting material on the end of the wire, removing the cut material from the end of the wire and twisting the strands of stranded wire and all of the operations are carried out in timed relationship to each other.

I claim:

1. A rotary wire stripping machine comprising: a support for releasably positioning an insulated wire member in a stationary position with an end portion projecting from said support, lock means movable from one position to a position in engagement with said support to lock said insulated wire in a stationary position, a table continuously reciprocating between a first position spaced a predetermined distance from the end of said wire to a second position adjacent to the end of said wire, a head member supported on said table for movement with the latter and for rotation about an axis in general alignment with the axis of said wire, said head forming a chamber receiving a predetermined part of the end portion of said wire when said table is in said second position, a pair of opposed blade members supported in said chamber of said head for rotation therewith and being movable from an initial position when said table is in the first position to a cutting position radially inward to engage and sever insulation material at a point spaced from the end of said wire when said table is in a second position, and guide elements movable with each of said blade members to guide the wire member between the end thereof and said blade members, said guide elements and said blade members engaging the severed insulation material as said table is moved from said second to said first position to remove said insulation material from said wire member.

2. The rotary wire stripping machine of claim 1 in which said guide elements associated with each of said blade members are adjustable radially of the axis of rotation relative to said blade members.

3. The rotary wire stripping machine set forth in claim 2 in which said guide elements form surfaces engageable with diametrically opposed surfaces of the insulation material on said wire member.

4. The rotary wire stripping machine set forth in claim 3 in which said surfaces are formed to grip the insulation material on said wire member and to rotate said insulation material when it is severed by said blade members and being removed from said wire member.

5. The rotary wire stripping machine set forth in claim 3 in which each of said guide elements form notches and said notches form said surfaces.

6. The rotary wire stripping machine of claim 1 and further comprising means for simultaneously moving said blade members a predetermined distance to said wire cutting position.

7. The rotary wire stripping machine of claim 6 in which said means for moving said blade members include a pair of arms connected to said blade members, said arms being pivotally connected to said head, and a cam mechanism movable axially for engagement with said arms to move the latter and said blade members radially of said axis of rotation.

8. The rotary wire stripping machine of claim 7 and further comprising means to move said cam member axially a selected distance to move said blade members to said cutting position.

9. The rotary wire stripping machine set forth in claim 8 in which said means for moving said cam member includes a reciprocating actuator having a rod portion operably connected to said cam mechanism for moving the latter axially, said rod portion being of adjustable length.

10. A wire stripping machine for removing insulation from the end of an insulated wire comprising: a support releasably positioning a wire member with an end portion projecting a predetermined amount from said support, a carriage movable in a predetermined path longitudinally of said wire between first and second positions, a rotatable head mounted on said carriage for continuous rotation about an axis aligned with said wire, said head normally being spaced from the end of said wire when said carriage is in said first position and receiving a predetermined length at the end of said wire when said table is in the second position, a pair of opposed blade members supported in said rotatable head for movement radially inwardly from a position spaced from the axis of rotation of said rotatable head, said blade members being movable to engage and cut insulation on said wire at a predetermined point spaced from the end of said wire when said carriage is in said second position, clamp means engageable with said support to prevent release of said wire from said support, first means to move said table between first and second positions, second means to reciprocate said clamp means between clamping and released positions and being operative to move said clamp means into engagement with said support upon movement of said table toward said first position, third means responsive to movement of said table to said second position to move said blade members to a working position in engagement with said wire to cut insulation thereon, and control means responsive upon movement of said blade members into engagement with said wire to maintain said carriage in said second position a predetermined time before said carriage moves toward said first position, said blade means being operative to remove insulation from said wire upon movement of said carriage from said second toward said first position.

11. The wire stripping machine of claim 10 in which said first, second and third means are air operated actuators, and further comprising a source of air for operating said actuators.

12. The combination of claim 10 and further comprising second control means operative during movement of said carriage a predetermined distance toward said first position to maintain said clamp means in engagement with said support and said blade members in said working position.

13. A wire stripping machine for removing insulation material from the end of an insulated wire member comprising: conveyor means, a plurality of support means associated with and movable by said conveyor means to hold a plurality of insulated wire members with end portions projecting from said support means, said conveyor means being periodically operated to advance said wire members to a working position, lock means movable from one position to a position in engagement with said support in said work position to lock said insulated wire in a stationary position, a carrier continuously reciprocating between a first position spaced from the end of said wire to a second position adjacent the end of said wire, a head member supported on said carrier for movement with the latter and for rotation about an axis in general alignment with the axis of said wire in said work position, said head forming a chamber receiving a predetermined length of the end portion of said wire when said carrier is in said second position, a pair of opposed blade members supported in said chamber of said head member for rotation therewith and being movable from an initial position when said carrier is in said first position to a position radially inward to engage and sever insulation material on said wire when said table is in said second position, wire guide elements movable with each of said blade members to guide said end portions of said wire during severing of insulation material, said blade members and guide elements engaging said severed insulation material as said table is moved from said second towards said first position and while said lock means is in engagement with said support to remove said severed insulation material from said wire member.

14. A combination of claim 13 in which said lock means includes a clamp element and an actuator to reciprocate said clamp element into and out of engagement with said wire support to lock and unlock the latter.

15. The combination set forth in claim 13 in which said clamp element and actuator is pivotally supported relative to said conveyor means for swinging movement of said clamp element and actuator upon movement of said conveyor when said clamp element is in engagement with said support.

16. The combination of claim 14 and further comprising guide means movable with said clamp element to engage and position the end of said wire member projecting from said support in alignment with the axis of rotation of said head member.

17. An apparatus for stripping insulation from wire including a rotatable head member reciprocating relative to a supported wire between initial and wire receiving positions, a clamp member reciprocating relative to said supported wire between a wire clamping position and a wire released position, a wire working member reciprocating between wire receiving and wire working positions, fluid pressure operated actuator means to reciprocate said members in timed relationship to each other and including valve means controlling communication between a source of fluid pressure and said actuator means and having a first position to reciprocate said head member to a wire receiving position and simultaneously to reciprocate said clamp member to said clamping position and having a second position to move said head member to said initial position, auxiliary valve means normally being closed to said source and being movable to an open position when said head member reaches said wire receiving position to communicate said source of fluid pressure with said actuator means reciprocating said clamp and said wire working members to maintain said clamp member in said clamping position and to simultaneously move said wire working member to said wire working position, said actuator means associated with said clamp and said wire working members being maintained in said clamping and wire working positions, respectively, during movement of said actuator means associated with said head member from said wire receiving position toward said initial position.

18. The combination of claim 17 and further comprising pressure responsive means to move said valve means to its said first position in response to pressure moving said actuator means associated with said wire working member to said wire working position of the latter.

* * * * *